June 12, 1934.  A. CHRISTIANSON  1,962,893
RAILWAY TRUCK
Filed Nov. 14, 1931  4 Sheets-Sheet 1
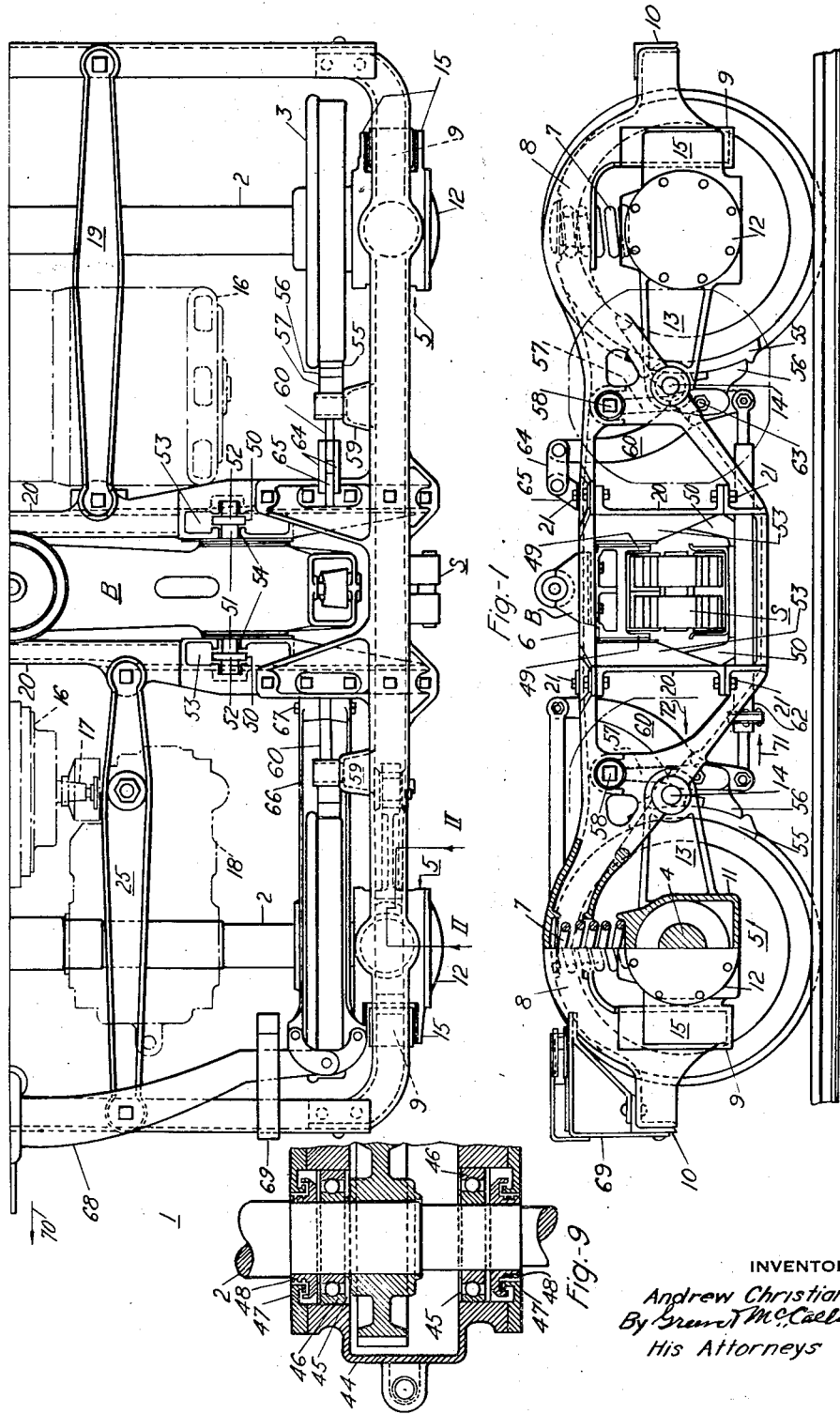
INVENTOR
Andrew Christianson
By His Attorneys June 12, 1934.  A. CHRISTIANSON  1,962,893
RAILWAY TRUCK
Filed Nov. 14, 1931  4 Sheets-Sheet 2
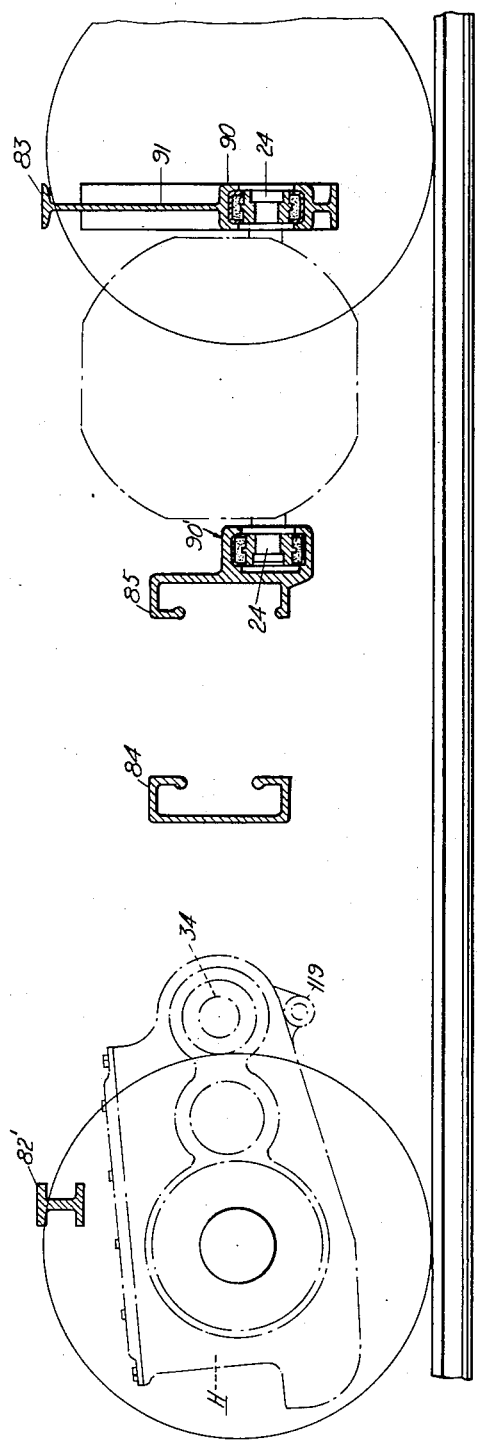
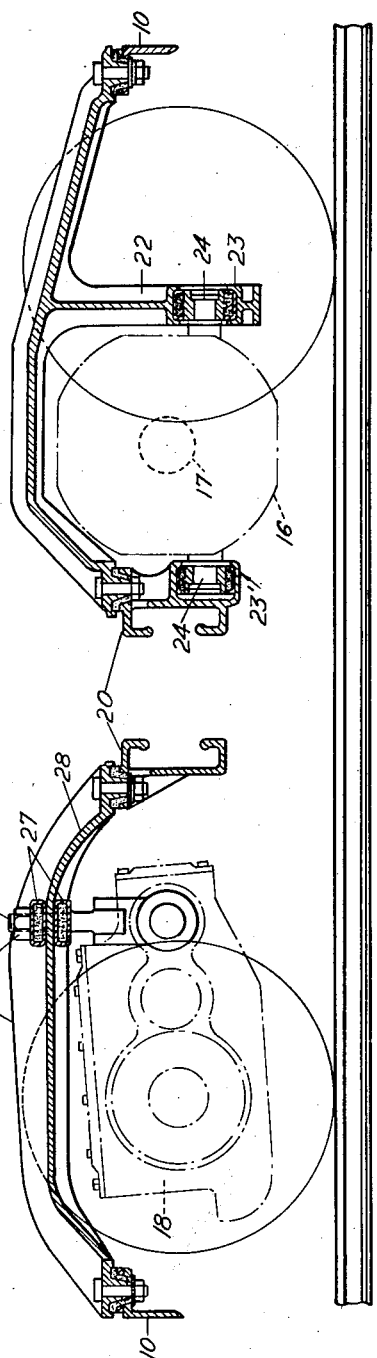
INVENTOR
Andrew Christianson
By
His Attorneys

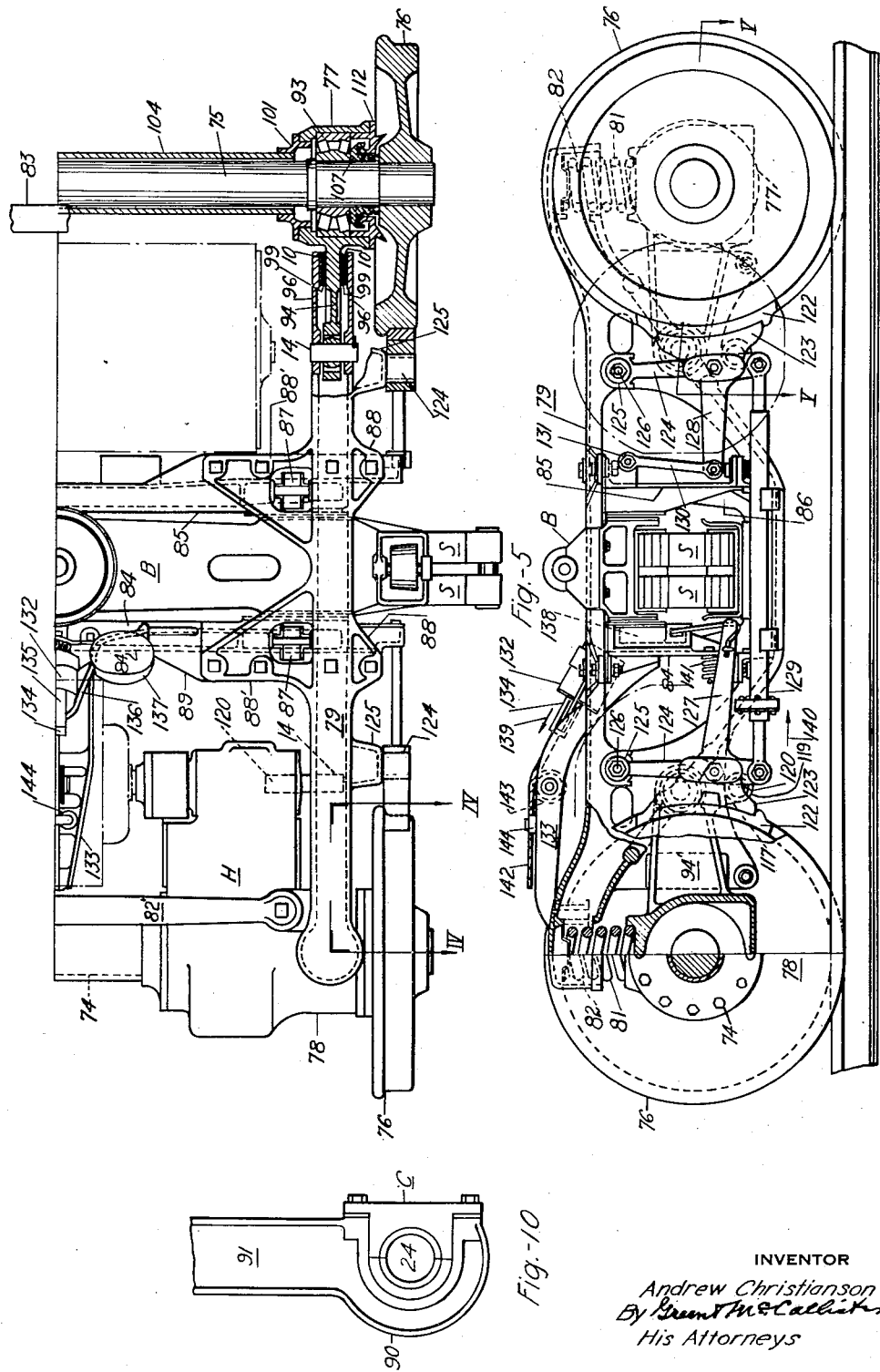

June 12, 1934.　　　A. CHRISTIANSON　　　1,962,893
RAILWAY TRUCK
Filed Nov. 14, 1931　　　4 Sheets-Sheet 4
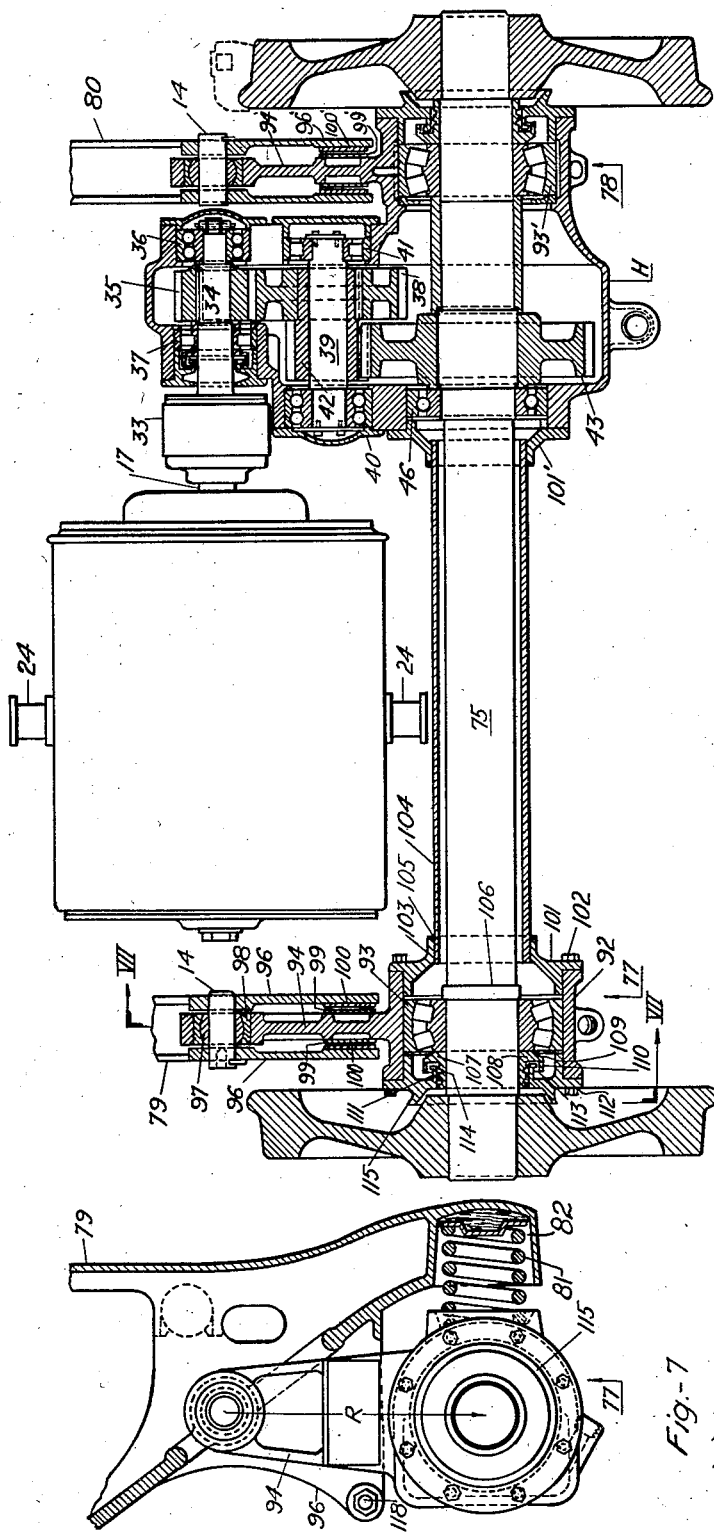

Patented June 12, 1934

1,962,893

UNITED STATES PATENT OFFICE 1,962,893

RAILWAY TRUCK

Andrew Christianson, Pittsburgh, Pa., assignor, by mesne assignments, to Standard Steel Car Corporation of Delaware, a corporation of Delaware Application November 14, 1931, Serial No. 574,936

8 Claims. (Cl. 105—182)

This invention relates to trucks for railway cars and the like, and more particularly to motorized railway trucks. Heretofore railway trucks, such as employed in electric street railway service, or in railway vehicles on electrified railroads, have been provided with one or more electric motors. These motors were mounted on the trucks and geared to the truck axle, the motor drive shafts and the truck axles being approximately parallel to each other. However, no provisions were made to make certain that the distance between the center line of the motor drive shafts and the center line of the truck axles, to which the motors were geared, would remain fixed during operating conditions.

In the prior art motorized trucks, the pinions on the motor shafts and the gears on the truck axles with which they meshed operated with the pitch circles in the correct relation only when the truck axles and the motor drive shafts occupied a predetermined relation with respect to each other. However, it is well known that in operation, because of unevenness in the trackway, or because of variations in the torque applied to the truck axles, or because of variations in the coefficient of traction between the wheel and rail at one end of the axle and the wheel and rail at the other end of the axle, the truck axles would move away from the motor drive shafts or towards them as the case may be, thereby causing the distance between the centers of the motor drive shaft pinions and the truck axle gears to vary. Since pinions and gears are designed to operate with the pitch circles tangent to each other, it follows that the gears and pinions will be subjected to severe strains and abuses when the centers of the pitch circles are shifted away from or towards each other.

An object of this invention is to provide a motorized railway truck in which the distance between the center lines of the truck axles and the center lines of the motor drive shafts shall remain fixed for all practical purposes under substantially all conditions of operation.

Specifically stated, it is an object of this invention to so hinge the truck axles and the accompanying journal boxes, as a unit, to the truck side frames at a point or points, that the center lines of the motor drive shafts shall be coincident and in line with the center lines of the respective hinge points.

A further object of the invention is the provision of a railway truck in which the truck axles and the accompanying journal boxes shall be free to swing about two or more hinge points, in which the hinge points lie in a line parallel to the center line of the truck axles.

And a still further object is the provision of an improved motorized truck for railway cars or the like that shall be simple in construction, efficient in operation, rugged and durable in service.

Other objects of the invention will, in part, be apparent and will, in part, be obvious from the following description taken in conjunction with the accompanying drawings, in which:

Figure 1 is a top plan view of a railway truck (only one half of the truck being shown), arranged and constructed in accordance with an embodiment of the invention;

Fig. 2 is a view in side elevation of the truck shown in Fig. 1, a part thereof being shown in section, said section being taken on line II—II of Fig. 1;

Fig. 3 is a fragmentary view, partially in section, showing the means whereby the truck motors and the gear boxes are supported on the truck;

Fig. 4 is a view in side elevation, partly in section, taken on line IV—IV of Fig. 5, of an inboard truck arranged and constructed in accordance with the invention;

Fig. 5 is a top plan view of one-half of the truck shown in Fig. 4, a part of said truck being shown in section taken on line V—V of Fig. 4;

Fig. 6 is a horizontal sectional view of a portion of the truck shown in Figs. 4 and 5 showing the motor and reduction gearing whereby the motor shaft is connected to the truck axle, and illustrating also the means whereby the center line of the truck axle is maintained parallel to and at a fixed distance from the center line of the motor drive shaft;

Fig. 7 is a fragmentary view in section of one end of one of the truck side frames, said section being taken along line VII—VII of Fig. 6, the car wheel being removed from the axle;

Fig. 8 is a fragmentary view, partly in section, showing the construction whereby the truck motors and the gear boxes are mounted on the truck frame of a truck, such as illustrated in Figs. 4 to 7, inclusive;

Fig. 9 is a partial view in horizontal section of the gear reduction case embodied in the truck illustrated in Figs. 1 and 2; and Fig. 10 is an end view of a motor trunnion bearing.

Throughout the drawings and the specification like reference characters indicate like parts.

In Figs. 1 and 2 of the drawings, an out-board bearing truck 1 is shown that includes a pair of truck axles 2 having car wheels 3 thereon. In out-board bearing trucks, the truck axles extend outwardly from the wheels to form journals 4 on which the journal bearings and journal boxes 5 for housing the bearings, are mounted. The car truck includes, also, side frames 6 (only one of which is shown) which are yieldingly mounted by means of coil springs 7 on the top of the journal boxes 5. As shown in Fig. 2, each end of the side frames includes a yoke portion 8 having a downwardly extending side portion 9 that partially embraces the journal boxes 5.

The side frames may be tied together at their opposite ends, as shown, by means of angle bars 10 riveted or otherwise secured thereto.

As shown, the journal boxes 5 include or comprise a journal box housing 11 in which are disposed the journal bearings, such bearings may be the usual Babbitt bearings or anti-friction roller or ball bearings, such as illustrated in Fig. 6. The outer ends of the journal box housings may be closed, as usual, by means of a cover plate or cap 12.

In order that the journal boxes 5 and the truck axles 2 may be pivotally secured to the side frames so that they may swing in an arc about the point of pivotal connection to the side frames, each journal box housing 11 is provided with an arm 13 formed preferably as an integral part of the housing, which is pivotally connected to its accompanying side frame by means of a pin 14.

In order to maintain the journal boxes and arms 13 in alinement with the side frames and thereby prevent lateral side play of the wheels and truck axles, each journal box is provided with a U-shaped yoke 15 that partially embraces its cooperating side portion 9 of the side frame yoke 8. Thus, as the car axles and journal boxes swing in an arc about pins 14, as centers, the U-shaped yokes 15, cooperating with the guide portions 9, maintain the journal boxes and truck axles in alinement even though the truck axles and wheels may tend to shift or move transversely of the truck frame.

In motorized railway trucks, two electric motors are usually employed, although in some cases one motor only is used. In the truck shown in Figs. 1 and 2, two electric motors 16 are provided. One of these motors is geared to one of the truck axles and the other motor is geared to the other axle.

As shown, each motor 16 is mounted on the car truck with its drive shaft 17 (in the case of an electric motor, the drive shaft is the armature shaft), parallel to the center line of its accompanying truck axle. Also the center line of the motor drive shaft is disposed in line and coincident with the central axes of pins 14 by which the journal box housing arms 13 are hinged to the side frames of the truck.

Each motor 16 is mechanically connected to its accompanying truck axle by a set of reduction gears disposed in a gear box 18 the details of which are illustrated in Fig 6 of the drawings. Where the distance between the center line of the motor shaft and the center line of its accompanying truck axle is determined to suit certain operating conditions, the reduction gearing is so selected and designed that the pitch circles of the intermeshing gears and pinions will be tangent to each other. The pitch circles being tangent to each other, it follows that the centers of the respective pitch circles will be a predetermined distance apart.

Since however, the motors are rigidly secured to the truck frame, and since the truck axles and journal boxes are hinged to the side frames, at points which are in line and coincident with the longitudinal center line of the respective motor drive shafts, it follows that the motor shafts and the truck axles associated therewith, will remain parallel to each other and at a constant distance from each other even though the truck axles and journal boxes swing in an arc about the hinge pins as centers. This being the case it follows that the intermeshing gears and pinions connecting the motor and the truck axles will at all times occupy the same relative positions to each other so that the gears and pinions will always be working at their pitch circles. Thus wear and tear on the gears is avoided which would otherwise arise if the distance between the centers of the truck axles and the centers of the motor drive shafts would change with variations in track conditions, in the torque applied by the motors to the truck axles, and in the coefficient of traction between the track rail and wheel at one end of the truck axle, and between the track rail and wheel at the other end of the axle.

The motors 16 shown in Figs. 1 and 2 and the gear boxes 18 are mounted on the truck frame in the manner illustrated in Fig. 3.

In order to mount the motors in place, a hanger 19 is provided for each motor. The hangers extend parallel to the side frames of the truck and are secured at one end to angle bar 10 and at the other end to a cross beam 20. The opposite ends of the cross beams are secured to the side frames by means of bolts 21 as indicated in Figs. 1 and 2.

As shown in Figs. 1, 2 and 3 cross beams 20 are spaced apart so that the truck bolster B and the accompanying elliptical springs S may be disposed therebetween. As will be set forth more fully hereinafter, beams 20 are so constructed that the springs S and bolster B may be mounted thereon.

Hanger 19 is formed with a depending or downwardly extending support 22 having a cap bearing 23 formed near to its lower end for accommodating a trunnion 24 rigidly attached to the frame of the motor. The opposite side of the motor is provided with a similar trunnion 24, which is also rigidly attached to the frame of the motor and disposed in a cap bearing 23' formed as an integral part of a cross beam 20. Bearings 23 and 23' may be constructed as shown in Fig. 9.

The motor is thus supported at its opposite sides from the beams 20 forming part of the truck frame. By such form of motor suspension, the motors are held against lineal movement, but are somewhat free to turn on the trunnions 24.

As illustrated in Fig. 3, and also in Fig. 6, each of gear boxes 18 is partially supported on its accompanying truck axle and partly from the truck frame by means of a hanger 25, which is secured at one end to angle bar 10 and at the other to a cross beam 20. The gear box is attached to hanger 25 by means of a hanger bolt 26, yieldingly secured to the hanger by means of yieldable washers 27, disposed one on each side of a web or flange 28 of the hanger, and a nut 29. The hanger bolt as shown is pivotally connected to the gear box at 31 directly above the point where the motor shaft enters the gear box 18.

The type of speed reduction gears employed between motors 16 and axles 2, which gears are housed and journaled in gear cases 18, may be of the form shown in connection with the inboard bearing truck illustrated in Fig. 6. As there shown, the motor shaft 17 is connected by a flexible coupling 33 to a shaft 34 on which a driving pinion 35 is keyed. As shown, shaft 34 is mounted in anti-friction bearings 35 and 37 carried by the gear case. Pinion 35 meshes with a gear 38 which is keyed to a countershaft 39, the countershaft being also mounted in anti-friction bearings indicated at 40 and 41. Countershaft 39 has a pinion 42 keyed thereto that meshes with a gear 43 keyed to the truck axle.

The gear case or housing shown in Fig. 6, being designed for inboard bearing trucks, differs in some particulars from the gear case or housing 18 shown in Fig. 1, and such differences reside chiefly in those portions of the respective housings through which the truck axles pass. That portion of gear case 18 which differs from the gear case shown in Fig. 6 is illustrated in Fig. 9. As illustrated in Fig. 9, the portion 44 of the gear case through which the truck axle 2 passes, is provided with aligned openings 45 to accommodate ball bearings 46 or their equivalents, which are mounted on the axle, one on each side of the truck axle gear 43.

The gear case and the bearings are held in alignment by means of caps 47 bolted to the gear case. Caps 47 as shown are provided with stuffing boxes 48 to prevent leakage of lubricant from the gear case. Thus, the gear cases 18 provided on each truck axle of Figs. 1 and 2, are supported on anti-friction bearings carried by the truck axles and by suspension hangers 25 and 26, previously described herein, carried by the truck frame.

The truck shown in Figs. 1 and 2 is provided with elliptical springs S, one at each side of the truck, that support the bolster B. The portions of the bolster resting on springs S are provided with depending flanges 49 that straddle the springs as shown more particularly in Fig. 2. The springs S and bolster B are supported from cross beams 20 by means of hangers 50 of substantially U-shape. As shown these hangers pass underneath the springs S and are supported on the top of beams 20 by means of pins 51 that pass through eyes or loops 52 formed at the upper ends of the legs of the hangers.

As shown more particularly in Figs. 1 and 2, the upwardly extending legs of the bolster and spring hangers, are disposed within sleeves 53 formed integrally with the cross beams 20. The open end of each sleeve at the top of beams 20 is formed with a seat 54 to accommodate the hanger supporting pins 51.

The truck shown in Figs. 1 and 2 is also provided with brake rigging that includes brake shoes 55 carried by brake shoe blocks 56. Blocks 56 are secured to depending swinging links 57, the upper ends of which, as shown, are pivotally supported on pins 58 journaled in bosses or brackets 59 extending inwardly from the side frames and in line with the tires of the car wheels 3. In order that the brakes may be actuated either to braking or to non-braking position, brake operating levers 60 and 61 are provided at each side of the truck, said levers being interconnected, as shown, by means of adjustable equalizers 62.

Brake operating lever 60 is pivotally connected at 63 to a brake shoe block 56, this point of pivotal connection being common to that by which the brake block is also connected to its supporting link 57. The upper end of brake actuating lever 60 is connected by a pair of links 64 to a lug 65 secured to the top of cross beam 20 disposed at the right of bolster B, as viewed from Figs. 1 and 2. Thus, as brake actuating lever 60 is moved to actuate brake shoe 56 into engagement with the wheel, the brake block and shoe swing on supporting link 57 about its pivot point 63. Since brake actuating lever 60 is connected by links 64 to the cross beam 20, the actuating lever will not become locked as the brake shoe swings to and from the car wheel.

Brake actuating lever 61 is pivotally mounted on brake block 60 by means of a pin 63' which serves also to connect swinging link 57 thereto. The upper ends of brake actuating levers 61, there being one lever on each side of the truck, are disposed between connecting links 66 and connected thereto by pins 67. The opposite ends of the links are connected as indicated in Fig. 2 to a beam 68 to which the actuating power for the brakes is applied. The brake actuating beam is slidably supported on brackets 69 attached to angle member 10.

To apply the brakes, brake beam 68 is actuated in the direction of arrow 70 by means of brake actuating apparatus (not shown). Movement of the brake beam in the direction of arrow 70 causes brake actuating levers 60 and 61 to turn counterclockwise as viewed from Fig. 2, about pins 63 and 63' acting as pivots. Such turning of brake actuating levers 60 and 61 causes the brake equalizers 62 to move in the direction of arrow 71 thereby swinging brake shoes 55, associated with the car wheels at the right hand end of the truck, as viewed from Figs. 1 and 2, into engagement with the tires of the wheels. When the brake shoes engage the wheels, a reaction is provided which causes brake actuating levers 61 to pivot about their lower ends, at the points where they are connected to the brake equalizers, thereby causing the brake blocks and the brake shoes carried thereby, to move in the direction of arrow 72, into engagement with the tires of the car wheels disposed at the left-hand end of the truck, as viewed from Figs. 1 and 2. By regulating the amount of power applied to the brake beam, the braking action on the car wheels may be regulated in the usual manner. By releasing the force applied to brake beam 68, so as to cause it to move in the opposite direction to that referred to above, the brake beam levers function to release the brake shoes from the car wheels.

By adjusting the length of the equalizers, the clearance between the brake shoes and the wheels may be regulated when in non-braking position, to suit operating requirements.

The railway truck shown in Figs. 5 and 6, comprises a pair of car axles 74 and 75 having car wheels 76 attached to the ends thereof. Journal boxes 77 and 78 are mounted on the car axles inwardly of the car wheels, as shown, on which truck side frames 79 and 80 are yieldingly supported by means of coil springs 81, the upper ends of which are nested in pockets or recesses 82 at the opposite ends of the side frames. The ends of the side frames are tied together by means of cross beams 82' and 83 from which the electric motors 16 are partially suspended or supported.

The side frames are also tied together at their middle portions by means of cross beams 84 and 85, bolted to the side frames as shown. The cross tie beams are spread apart to provide space for the truck springs S and the bolster B. The springs S and bolster B are mounted on the cross beams 84 and 85 by means of U-shaped hangers 86 and pins 87, the construction being substantially that shown in Figs. 1 and 2.

In order to strengthen and rigidify the connection of the side frames to the cross beams 84 and 85, each side frame is provided with outwardly and inwardly extending bracket arms 88 and 88' at the top and bottom cords thereof, the bracket arms being bolted, as illustrated, to flanges 89 forming part of the cross beams. Each motor 16 is provided with trunnions 24 rigidly attached to the motor frame at diametrically opposite sides of the longitudinal axis of the motor drive shaft, as shown in Fig. 6. The trunnions farthest from the axles are journaled in cap bearings 90' formed on cross beams 84 and 85 as illustrated in Figs. 8 and 10.

The trunnions nearest the truck axles are journaled in cap bearings 90 formed at the lower ends of arms 91 that depend from the respective motor hangers 82 and 83, secured to the opposite ends of the truck side frames.

As indicated in Fig. 10, half of each motor trunnion bearing is formed integrally with the depending members of the respective motor hangers 82 and 83 and the other half is formed in a cap C which is bolted in place as shown.

Each journal box 77 may be constructed, as illustrated in Fig. 6 and comprises a housing 92 having a cylindrical bore therethrough for accommodating an anti-friction bearing 93. As shown, the outer race of the bearing fits the housing bore snugly, as is usual practice, and the inner race of the bearing fits snugly over the journal of the truck axle.

The journal box housing is provided with an arm 94 formed integrally therewith which is pivotally connected to the side frame by means of a hinge pin 14.

As shown, the arm 94 operates between depending aprons 96 formed integrally with the side frames, which aprons act as guides for the journal box hinge arm. As shown more particularly in Figs. 5 and 6, hinge pin 14 extends through a spheroidal member 97 which is journaled in a bushing 98 carried at the outer end of the journal box hinge arm 94. The spheroidal member and the bushing provide a ball-and-socket bearing for the journal box hinge arm so that it may swivel on the ball-and-socket bearing and at the same time turn on the hinge pin when, because of uneven track conditions, one of the car wheels rises and the other falls.

The journal box hinge arm is provided on its opposite sides with wear plates 99 that co-operate with wear plates 100 formed on the adjacent faces of the side frame aprons 96. By providing these wear plates, the side frame aprons are protected from wear incident to longitudinal and angular displacement of the car truck axle.

The motor side of the journal box housing is closed by means of a cap 101 which is bolted thereto by means of cap screws 102. Cap 101 is formed with a flange 103 concentric with the truck axle to accommodate a tubular sleeve 104 disposed about the car axle as shown. The sleeve may be welded to the cap flange 103 as indicated at 105. The opposite end of the sleeve is welded to a cap 101 similar to the one associated with the journal box housing 77 and which also is bolted to the gear case housing the gear drive, previously described herein in connection with the gear drive provided for the truck illustrated in Figs. 1 and 2.

The anti-friction bearing 93 is held in position on the truck axle between a collar 106 formed on the truck axle and an oil retaining member 107 also secured to the car axle. The oil retaining member includes a circumferential flange 108 having a cone-shaped surface 109 along which lubricant flows under the action of centrifugal force when the car axle is in motion. A ring member 110 is formed integral with the periphery of the flange 108 and overhangs or overlaps a sleeve 111 which is formed integrally with a cap 112 which closes the wheel side of the journal box housing 77. The sleeve portion of the cap is provided also with a circumferential flange 113 which is disposed within the ring portion of oil retaining member 107.

The oil retaining member 107 may be provided with circumferential grooves 114 in which packing may be disposed to prevent the leakage of lubricant contained in the journal box housing. The outer face of cap 112 is provided with a frustum conical flange 115 that partially embraces a portion of the car wheel hub as indicated.

The journal box housing disposed at the right-hand side of the car axle, as viewed from Fig. 6, is formed integrally with the gear case or housing H in which the gears and pinions, forming the drive between the motor and the car axle, are housed. An arm 94' similar to the arm described in connection with journal box housing 77, is formed integrally with journal box housing 78, and hinged or pivotally mounted on the accompanying side frame 79 by means similar to that described in connection with the aforementioned journal box housing 77. The journal box housing 78 may, as shown, be formed as an integral part of the gear case, and being similar in other respects to the journal box housing 77, similar and corresponding parts are designated by primed characters.

The gear cases, of which journal box housings 78 form an integral part, are partially supported by their accompanying truck axles, and partially by the hinged arms 94' (see Fig. 4). As shown in Fig. 4, arms 94' are provided with depending lugs 117 in which bearings 118 are formed in alignment with bearings 119 formed in the bottom of each gear case H below shafts 34. A pin 120 extends through each pair of bearings 118 and 119, thus supporting each gear case on its associated hinge arm 94'.

With the form of construction embodied in the truck shown in Figs. 4 and 5, it will be apparent that the truck axles and journal box housings are free to swing about an axis passing through the center lines of the hinge pins 14 and the longitudinal centers of the respective motor drive shafts 17. Since, by construction, these axes remain fixed with respect to the side frames and the truck axles, it follows that the truck axles will at all times be parallel to and at a fixed distance R (see Fig. 7) from the longitudinal axes of the motor drive shafts from which they are driven. Therefore the gears and pinions connecting each motor with its associated truck axle will always be in alignment and operating at their pitch circle.

The truck illustrated in Figs. 4 and 5 is also provided with brake rigging, but the construction and operation thereof differs from the construction and operation of the brake rigging provided for the truck illustrated in Figs. 1 and 2.

The brake rigging provided for the truck shown in Figs. 4 and 5, includes a brake shoe 122 for each wheel and a brake block 123 for supporting each brake shoe. Each brake shoe and block is pivotally supported on a depending link 124 mounted on a journal 125 formed integrally with the side frames as shown in Fig. 5, and secured in place by a bolt 126. As shown in Figs. 4 and 5, two bell cranks 127 and 128 are provided for actuating the brake shoes into and out of braking position. Bell crank 128 as shown is pivotally supported at the knee thereof to the brake block 124, and bell crank 127 is similarly supported on the other brake block. The depending arms of the bell cranks are tied together by an equalizer 129 the length of which may be adjustable so that the clearance between the brake shoes and their co-operating wheels, when in the non-braking position, may be adjusted to suit operating requirements. The horizontally extending arm of bell crank 128 is pivotally connected at its outer end to the lower end of a swinging link 130, which is pivotally supported at its upper end, as at 131, to cross beam 85.

The opposite side of the truck shown in Figs. 4 and 5 is also provided with brake rigging and elements corresponding to that described above.

In order that the brake rigging may be actuated to and from braking position, means are provided for applying and releasing the brakes. Such means, as shown, comprises an air cylinder 132 mounted on a supporting member 133 forming part of the truck frame. The cylinder has a piston (not shown) working therein to which is attached a piston rod 134 provided with a pulley 135. A cable 136 operates over the pulley 135 and has its opposite ends attached to the outer ends of the horizontally extending arms of bell cranks 127. As shown in Fig. 5, the cable 136 runs from the piston rod pulley 135 under pulley 137 and over a pulley 138 carried by the side frames, and thence to the outer end of the horizontal arm of bell crank 127. The opposite half of the truck frame is provided with pulleys corresponding to pulleys 137 and 138.

When air is applied to the cylinder 132, piston rod 134 moves in the direction of arrow 139 thereby turning bell cranks 127 in such a direction that the brake equalizers 129 move in the direction of arrow 140. When the brake equalizers have moved a predetermined distance, the brake shoes at the opposite ends of the equalizers are applied to the wheels thereby arresting further movement of the equalizers.

When movement of the brake equalizers is arrested, bell cranks 127 turn about the lower ends of the depending arms thereof at the points where they are connected to the equalizers thereby swinging their accompanying brake shoes and brake blocks into braking position. When the air pressure is released from cylinder 132, a pair of springs 141, disposed one at each side of the truck frame and connected to bell cranks 127, return the brake rigging to non-braking position.

In order that the brakes may be operated manually, as by the usual emergency braking devices, a cable 142, attached to the piston rod 134, is provided. This cable operates over a pulley 143 and between guide pulleys 144.

From the foregoing description it will be apparent that motorized railway trucks are provided in which the truck axles and journal boxes are hinged to the side frames of the truck so that the radial distance between the hinge points and the center lines of the driving motors will remain fixed even though the truck axles move up or down with uneven conditions in the trackway. The construction shown is applicable to both the inboard and the outboard type of truck.

In conjunction with the above mentioned features, a simple and efficient brake rigging for each type of truck is also provided, whereby efficient braking action may be obtained without resorting to the usual complicated and cumbersome brake rigging mechanisms provided heretofore with motorized railway trucks.

While certain details of construction have been shown and described, it will be appreciated by those skilled in this particular art that such details and the arrangement thereof may be modified and changed to suit operating conditions, without departing from either the spirit or the scope of the invention. Therefore, it is desired that only such limitations shall be placed on the invention as are imposed by the prior art and the appended claims.

What I claim as new and desire to secure by Letters Patent is:—

1. A railway car truck having axles and wheels, journal boxes for said wheels, links pivotally connecting opposite ends of one of said axles to the truck frame so as to cause said axle to swing through a fixed arc having its center at the point where the links are connected to the truck frame, as the truck axle rises or falls with variations in the trackway, a motor on said truck frame having its motor shaft geared to the swinging axle, said motor being so positioned that the longitudinal axis of the shaft thereof coincides with the center of the arc described by the axle.

2. A railway car truck having journal boxes and truck axles journaled in the boxes, a motor on said truck having its motor shaft gear-connected to one of said axles, and means pivotally connecting the axle, to which said motor is geared to the truck at such a point that the journal boxes and truck axle may move in an arc concentric with the center line of the motor shaft.

3. A railway car truck having side frames, truck axle journal boxes at the opposite ends of the side frames, axles journaled in said boxes, swinging arms of equal length pivotally connecting each journal box to the side frames, and a motor for each axle geared thereto, the drive shaft of each motor having its longitudinal axis coincident with the point of pivotal connection of the journal boxes, of the truck axle to which the motor is geared, to the accompanying side frame.

4. A railway car truck having side frames, truck axle journal boxes at each end of each side frame, axles journaled in said boxes, swinging arms of equal length formed integrally with said journal boxes pivotally connected to the side frames, and a motor for each axle geared thereto, the drive shaft of each motor having its longitudinal axis coincident with the point of pivotal connection of the journal boxes, of the truck axle to which the motor is geared, to the accompanying side frame.

5. A railway car truck having truck axles and journal boxes, motors mounted on the truck, one of which has its drive shaft geared to one axle and the other having its drive shaft geared to the other axle, and means pivotally connecting each car axle and its accompanying journal boxes to the truck at a point coincident with the longitudinal axis of the drive shaft of its associated motor.

6. An out-board bearing railway car truck comprising a pair of truck axles and wheels, each axle having journals extending outwardly from each wheel, a journal box on each of said truck axle journals, truck side frame yieldingly mounted on the journal boxes, a swinging arm pivotally connecting each journal box to its accompanying side frame, and a motor for each axle geared thereto, the drive shaft of each motor having its longitudinal axis coincident with the point of pivotal connection of the journal boxes, of the truck axle to which the motor is geared, to the accompanying side frame.

7. An out-board bearing railway car truck comprising a pair of truck axles and wheels, each axle having a journal extending outwardly from each wheel, a journal box on each of said truck axle journals, truck side frames yieldingly mounted on the journal boxes, said side frames having downwardly extending guide members partially embracing the journal boxes, side thrust members formed on each journal box, said thrust members extending outwardly from the journal box so as to partially embrace said guide members, a swinging arm pivotally connecting each journal box to its accompanying side frame, and a motor for each axle geared thereto, the drive shaft of each motor having its longitudinal axis coincident with the point of pivotal connection of the journal boxes, of the truck axle to which the motor is geared, to the accompanying side frame.

8. An out-board bearing railway car truck comprising a pair of truck axles and wheels, each axle having a journal extending outwardly from each wheel, a journal box on each of said truck axle journals, truck side frames yieldingly mounted on the journal boxes, a swinging arm pivotally connecting each journal box to its accompanying side frame, and a motor for each axle geared thereto, the drive shaft of each motor having its longitudinal axis coincident with the point of pivotal connection of the journal boxes of the truck axle to which the motor is geared, to the accompanying side frame.

ANDREW CHRISTIANSON.